US011332626B2

(12) United States Patent
Yamakawa et al.

(10) Patent No.: US 11,332,626 B2
(45) Date of Patent: May 17, 2022

(54) PAINT, METHOD FOR PRODUCING PAINT, COATED COMPONENT AND METHOD FOR PRODUCING COATED COMPONENT

(71) Applicant: TOYOTA JIDOSHA KABUSHIKI KAISHA, Toyota (JP)

(72) Inventors: Takeshi Yamakawa, Atsugi (JP); Naohide Uchida, Numazu (JP); Yoshihisa Serizawa, Shizuoka-ken (JP); Shoichi Hayasaka, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 16/591,884

(22) Filed: Oct. 3, 2019

(65) Prior Publication Data
US 2020/0115567 A1    Apr. 16, 2020

(30) Foreign Application Priority Data

Oct. 10, 2018   (JP) .............................. JP2018-191948

(51) Int. Cl.
 *C09D 7/40*   (2018.01)
 *C09D 7/61*   (2018.01)
 *C09D 7/63*   (2018.01)
 *C08K 3/04*   (2006.01)
 *C09D 5/00*   (2006.01)

(52) U.S. Cl.
 CPC .................. *C09D 7/70* (2018.01); *C08K 3/04* (2013.01); *C09D 5/00* (2013.01); *C09D 7/61* (2018.01); *C09D 7/63* (2018.01); *C08K 2201/00* (2013.01)

(58) Field of Classification Search
 CPC ... C09D 7/70; C09D 7/63; C09D 7/61; C09D 5/00; C09D 5/29; C09D 7/40; C09D 201/00; C09D 5/36; C08K 7/02; C08K 3/04; C08K 2201/00; B32B 27/18; B32B 27/20
 See application file for complete search history.

(56) References Cited

U.S. PATENT DOCUMENTS 4,407,871 A * 10/1983 Eisfeller ................ B05D 5/068
                                                      427/250
6,328,358 B1   12/2001 Berweiler
2010/0022696 A1  1/2010 Maruoka et al.

FOREIGN PATENT DOCUMENTS

JP    2000-159039 A    6/2000
JP    2000-178478 A    6/2000
(Continued)

OTHER PUBLICATIONS

Akafuah NK, Poozesh S, Salaimeh A, Patrick G, Lawler K, Saito K. Evolution of the Automotive Body Coating Process—A Review. Coatings. 2016; 6(2):24. doi:10.3390/coatings6020024 (Year: 2016).*

(Continued)

*Primary Examiner* — Kevin E Yoon
*Assistant Examiner* — Marites A Guino-O Uzzle
(74) *Attorney, Agent, or Firm* — Sughrue Mion, PLLC

(57) ABSTRACT

A new paint which makes it possible for a coating film to have both brightness and radiotransparency is demanded. The paint includes a flake, wherein the flake has a sea-island structure of including a plurality of island phases which are formed of metal, and a sea phase that is formed of resin or DLC, the sea phase linking the island phases to each other.

7 Claims, 10 Drawing Sheets

(56) References Cited

FOREIGN PATENT DOCUMENTS

| | | | |
|---|---|---|---|
| JP | 2000-344032 A | 12/2000 | |
| JP | 2005-162977 A | 6/2005 | |
| JP | 2006-281726 A | 10/2006 | |
| JP | 2008-221802 A | 9/2008 | |
| JP | 2009-40018 A | 2/2009 | |
| JP | 2009-191097 A | 8/2009 | |
| JP | 2010-030075 A | 2/2010 | |
| JP | 2013-241583 A | 12/2013 | |
| WO | WO-02090613 A2 * | 11/2002 | ............... C09D 7/61 |

OTHER PUBLICATIONS

Peckus, D., Tamulevičius, T., Meškinis, Š. et al. Linear and Non-linear Absorption Properties of Diamond-Like Carbon Doped With Cu Nanoparticles. Plasmonics 12, 47-58 (2017). DOI 10.1007/s11468-016-0227-0 (Year: 2017).*

"Batch Type Sputtering System for Non-Conductive Metal Coating", ULVAC, Inc., J. Vac. Soc. Jpn., 2010, pp. 46-48, vol. 53, No. 1.

* cited by examiner

PAINT, METHOD FOR PRODUCING PAINT, COATED COMPONENT AND METHOD FOR PRODUCING COATED COMPONENT

FIELD

The present application discloses a paint that can form a coating film having both brightness and radiotransparency, etc.

BACKGROUND

A paint including a flat bright material may be used for securing brightness of a coating film of a coated component as disclosed in Patent Literature 1. In contrast, it is necessary to secure radiotransparency of a coating film in a case where a radio source such as a radar is disposed behind a coated component as disclosed in Patent Literatures 2 and 3. In Patent Literature 1, a position and an orientation of bright material in a coating film is controlled for making the coating film have both brightness and radiotransparency.

CITATION LIST

Patent Literature

Patent Literature 1: JP 2010-030075 A
Patent Literature 2: JP 2000-159039 A
Patent Literature 3: JP 2000-344032 A

SUMMARY

Technical Problem

In a paint including a bright material, the bright material randomly disperses, and the positional relationship among the dispersing bright materials can change every moment. When a surface of a component is coated with a paint including a bright material, the bright material randomly adheres to the surface of the component, which therefore makes it difficult to accurately control the position and orientation of the bright material in a coating film, which may result in failure in obtainment of desired brightness or radiotransparency. It can be considered to use a rare metal such as indium for coating in order to achieve both brightness and radiotransparency, which however increases costs. A new technology which makes a coating film have both brightness and radiotransparency is demanded.

Solution to Problem

The present application discloses, as one means for solving the problems, a paint including a flake, wherein the flake has a sea-island structure of including a plurality of island phases which are formed of metal, and a sea phase that is formed of resin or DLC, the sea phase linking the island phases to each other.

In the paint of the present disclosure, the island phases may be arranged in a width direction of the flake.

In the paint of the present disclosure, the number of the island phases arranged in a thickness direction of the flake may be only one.

The present application discloses, as one means for solving the problems, a method for producing a paint, the method comprising: a first step of forming a plurality of island phases on a surface of a base material, the island phases being formed of metal; a second step of coating the surface of the base material, on which the island phases are formed, with resin or DLC (Diamond Like Carbon), to form a film on the surface of the base material, the film having a sea-island structure of including the island phases, and a sea phase formed of the resin or DLC, the sea phase linking the island phases to each other; a third step of crushing the film to form flakes; and a fourth step of obtaining a paint where the flakes are dispersed.

In the producing method of the present disclosure, in the first step, the metal may be deposited on the surface of the base material, to form the island phases on the surface of the base material.

The present application discloses, as one means for solving the problems, a coated component that has a coating film on a surface thereof, wherein the coating film includes a plurality of flakes, and each of the flakes has a sea-island structure of including a plurality of island phases which are formed of metal, and a sea phase that is formed of resin or DLS, the sea phase linking the island phases to each other.

For example, the coated component of the present disclosure may be produced via the step of spraying the paint of the present disclosure over a surface of a component to coat the component.

Advantageous Effects

A plurality of island phases which are formed of metal (metallic phases) are linked by a sea phase that is formed of resin or DLC, to form a flake included in the paint of this disclosure. The positional relationship between a plurality of the island phases is in a fixed state, which makes it possible to secure a certain space between a plurality of the island phases. Including such a flake in a paint makes a plurality of island phases function as a bright material to make it possible to obtain a metallic luster, and makes it possible to transmit a radio wave via a space between a plurality of the island phases. As described above, using the paint of the present disclosure makes it possible to easily form a coating film having both brightness and radiotransparency.

DETAILED DESCRIPTION OF EMBODIMENTS

1. Paint

Figure 1:
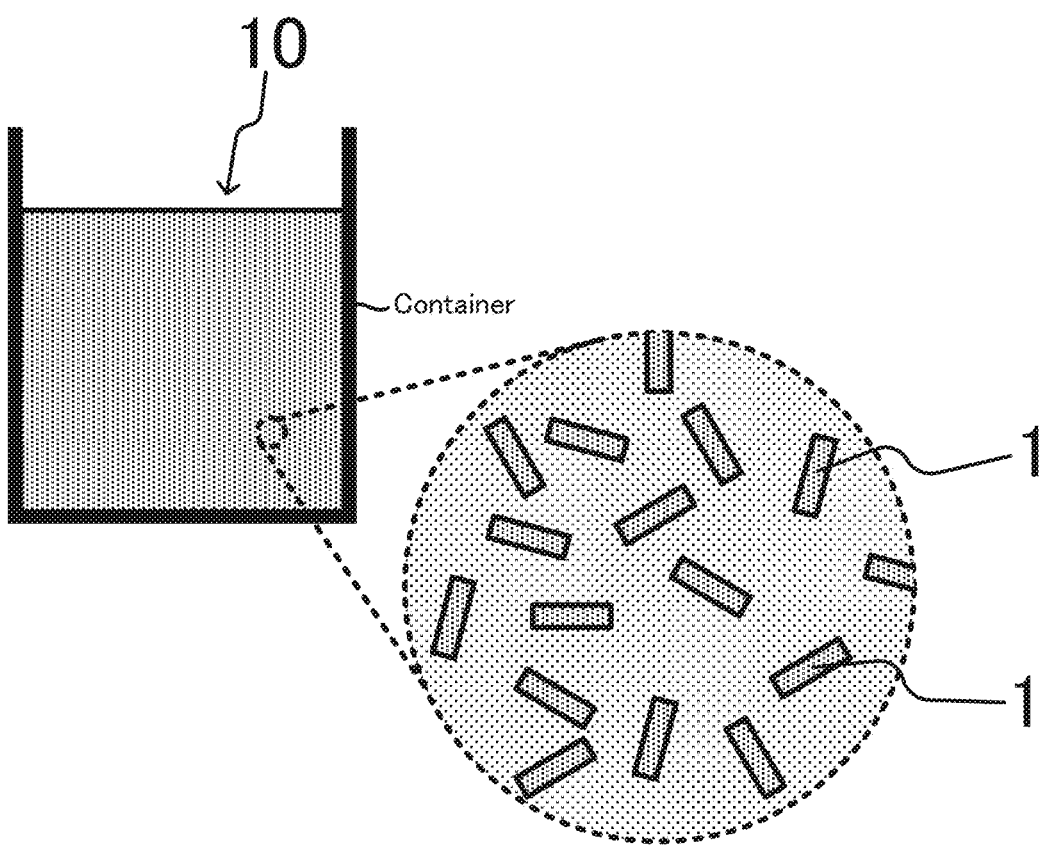
FIG. 1 is an explanatory schematic view of a paint 10.
Figure 2:
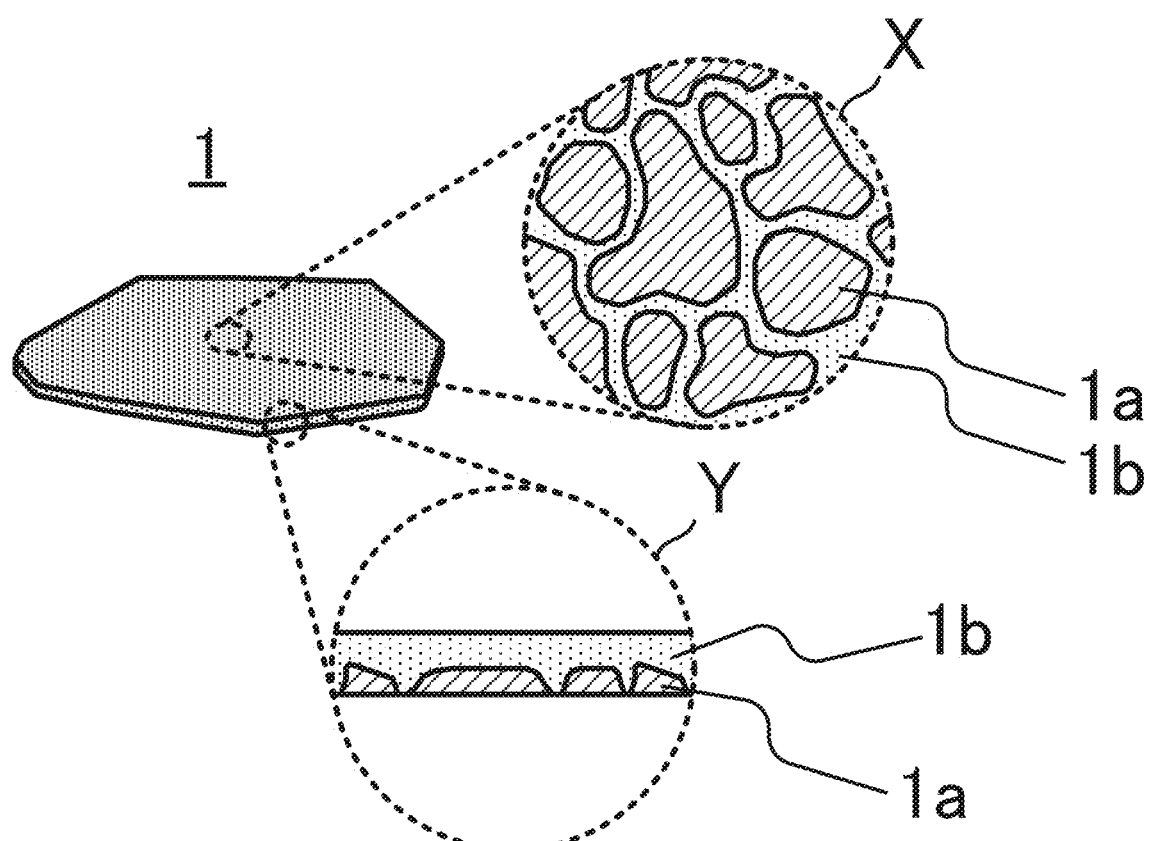
FIG. 2 is an explanatory schematic view of a flake 1.

FIGS. 1 and 2 schematically show one example of a paint 10 and a flake 1 included in the paint 10, respectively. As shown in FIGS. 1 and 2, the paint 10 includes the flakes 1, 1, . . . . Each of the flakes 1 has a sea-island structure of including a plurality of island phases 1a, 1a, . . . which are formed of metal, and a sea phase 1b that is formed of resin or DLC, the sea phase linking the island phases 1a, 1a, . . . to each other.

1.1. Flake

The flake 1 is flat as a whole, and the width thereof is larger than the thickness thereof. The size of the flake 1 is not specifically limited as long as the flake 1 may disperse over the paint 10. For example, the size of the flake 1 may be the same as that of a bright material included in a conventional paint. Specifically, the width of the flake 1 may be 1 μm to 1 mm. The lower limit of the width may be no less than 3 μm, and may be no less than 5 μm. The upper limit of the width may be no more than 500 μm, and may be no more than 100 μm. The thickness of the flake 1 may be 0.1 μm to 5 μm.

1.1.1. Island Phase

As shown in FIG. 2, the flake 1 includes a plurality of the island phases 1a, 1a, . . . which are formed of metal, which makes it possible for the flake 1 to function as a bright material in the paint 10. A metal constituting the island phases 1a is not specifically limited as long as having luster that makes it possible for the flake 1 to function as a bright material. An example thereof is at least one metal selected from aluminum, tin, chromium, nickel and copper. Among them, aluminum is preferable.

As shown in the enlarged view X in FIG. 2, each of a plurality of the island phases 1a, 1a, . . . has a certain area, which makes it possible to reflect a light wave on the surface of the island phase 1a. That is, metallic luster is obtained on a coating film owing to the island phase 1a. A plurality of the island phases 1a, 1a, . . . have only to be arranged via the sea phase 1b as being separated by a space. In particular, a plurality of the island phases 1a, 1a, . . . are preferably arranged in the width direction (the direction orthogonal to the thickness direction) of the flake 1 as shown in the enlarged view Y in FIG. 2. Lateral arrangement of a plurality of the island phases 1a, 1a, . . . along the width direction of the flake 1 as described above causes a plurality of the island phases 1a, 1a, . . . to function as one large quasi-metallic face as a whole when the flake 1 is viewed in the thickness direction (enlarged view X in FIG. 2), to obtain a better metallic lustrous flake.

In contrast, no overlaps between the island phases 1a, 1a in the thickness direction of the flake 1 leads to further improved radiotransparency of the flake 1 in the thickness direction. From this viewpoint, only one island phase 1a is preferably arranged in the thickness direction of the flake 1 as shown in the enlarged view Y in FIG. 2.

The shape of the island phase 1a is not specifically limited. The shape thereof is preferably flat as shown in FIG. 2. In a preferred embodiment, the width of the island phase 1a is larger than the thickness thereof. In particular, better brightness and radiotransparency are exerted when the size of the island phase 1a is small enough for a wavelength of an electromagnetic wave and also, is large enough for a wavelength of a light wave. For example, the measure of the island phase 1a is preferably no more than 1/10 of a wavelength of an electromagnetic wave, and larger than 1/10 of a wavelength of a light wave. More specifically, the width of a plurality of the island phases 1a, 1a, . . . (as described later, the average value of the Feret diameters of a plurality of the island phases 1a, 1a, . . . ) is preferably 50 nm to 500 μm. In contrast, the thickness of a plurality of the island phases 1a, 1a, . . . is not specifically restricted. For example, the thickness thereof may be equal to or less than that of the flake 1.

Figure 3:
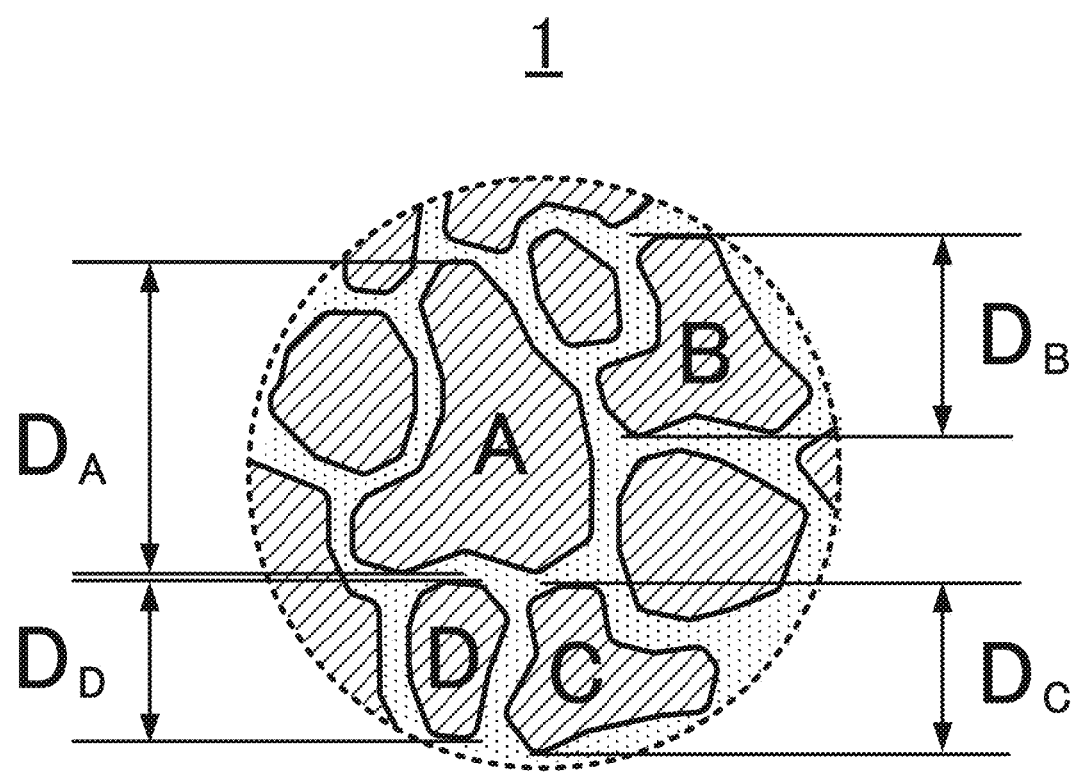
FIG. 3 is an explanatory schematic view of a preferred size of an island phase 1a of the flake 1.

"Width of a plurality of the island phases 1a, 1a, . . . " in the present application can be identified as the average value of the Feret diameters of the island phases 1a, 1a, . . . viewed in the thickness direction (enlarged view X in FIG. 2). That is, as shown in FIG. 3, a two-dimensional image of the flake 1 is obtained using SEM or the like, the respective Feret diameters $D_A$, $D_B$, $D_C$, $D_D$, . . . of a plurality of the island phases A, B, C, D, . . . included in the two-dimensional image are measured, and the average value is calculated by dividing the sum of the measured diameters by the measured number, which makes it possible to identify the width of a plurality of the island phases 1a, 1a, . . . .

All of a plurality of the island phases 1a, 1a, . . . do not necessarily satisfy the width and thickness as described above in the flake 1 according to a preferred embodiment. A part of the island phases 1a may be larger or smaller. However, all of a plurality of the island phases 1a, 1a, . . . preferably have the width and thickness as described above in view of obtaining a better brightness and radiotransparency.

The area of each of a plurality of the island phases 1a, 1a, . . . , a space between a plurality of the island phases 1a, 1a, . . . , and the volume of the island phases 1a, 1a, . . . in the flake 1 are not specifically restricted, and may be suitably determined depending on the characteristics to be aimed (brightness and radiotransparency). The area of a plurality of the island phases 1a, 1a, . . . occupying the flake 1 when the flake 1 is viewed in the thickness direction (enlarged view X in FIG. 2) is not specifically restricted either, and may be suitably determined depending on the characteristics to be aimed (brightness and radiotransparency).

1.1.2. Sea Phase

As shown in FIG. 2, the flake 1 includes the sea phase 1b that links a plurality of the island phases 1a, 1a, . . . to each other. A plurality of the island phases 1a, 1a, . . . are fixed to each other via the sea phase 1b as being separated by a predetermined space. The sea phase 1b is formed of resin or DLC. Resin and DLC both have a high insulation property, and radiotransparency. That is, a radio wave reaching a surface on one side of the flake 1 can be transmitted to the opposite surface thereof via the sea phase 1b present on the space between a plurality of the island phases 1a, 1a, . . . .

A resin used here is not specifically limited as long as the shape of the flake 1 can be kept in the paint 10. Preferred examples thereof include at least one resin selected from PMMA (poly(methyl methacrylate)), PC (polycarbonate) and PVB (polyvinyl butyral). PMMA, PC and PVB are all transparent and have an excellent insulation property. These transparent resins have a high visible light transmittance, and high stability as resin. In addition, these resins are compatible with a general paint resin.

DLC is amorphous carbon having a skeletal structure of carbon atoms including both sp3 bonds of diamond and sp2 bonds of graphite. DLC is extremely hard and has a high flatness. In addition, DLC is extremely stable chemically, and optically a high transparency can be secured by controlling its hydrogen content etc.

In the flake 1, the sea phase 1b may be provided so that the whole of the island phases 1a, 1a, . . . is completely buried therein, or so that part of the island phases 1a, 1a, . . . is exposed. That is, the thickness of the sea phase 1b may be equal to, thicker or thinner than that of the island phase 1a in the flake 1. The sea phase 1b may smooth the surface of the flake 1 as shown in FIG. 2, or may be provided so as to have unevenness along the shapes of the surfaces of the island phases 1a, 1a, . . . . If part of the island phase 1a is exposed on the sea phase 1b, the exposed surface of the island phase 1a is preferably passivated so that the color of the exposed surface of the island phase 1a does not change due to oxidation. For example, the exposed surface of the island phase 1a is preferably coated with a base material or resin as described later.

1.1.3. Sea-Island Structure

The flake 1 has a sea-island structure of linking a plurality of the island phases 1a, 1a, . . . to each other via the sea phase 1b. "Sea-island structure" in the present application is such a structure that the sea phase 1b is present around a plurality of the island phases 1a, 1a, . . . having a certain area and a plurality of the island phases 1a, 1a, . . . are arranged via the sea phase 1b as separated by a space when the cross section of the flake 1 is observed.

1.1.4. Other Phases

The flake 1 has only to have the specific sea-island structure. The flake 1 may optionally include any phase other than the island phase 1a and the sea phase 1b as long as the sea-island structure can be kept. For example, an additive such as filler and pigment may be contained in the flake 1 in order to improve formability etc. of the flake 1, or in order to add complex colors to the flake 1. Some surface treatment may be carried out on the flake 1 in order to, for example, improve dispersiveness in the paint 10.

1.1.5. Content of Flake in Paint

The content of the flakes 1, 1, . . . in the paint 10 is not specifically limited, and may be adjusted depending on the characteristics to be aimed. When brightness is desired to be improved, it is preferable to increase the content of the flakes 1, 1, . . . . Radiotransparency can be secured in a coating film as described later even when a large amount of the flakes 1, 1, . . . is incorporated into the paint 10, which causes the flakes 1, 1, . . . to be densely in contact with each other in the coating film.

1.2. Components Other than Flake

A feature of the paint 10 is to include the flake 1. It is not necessary to include any bright material (for example, see Patent Literature 1) other than the flake 1 in the paint 10 since the flake 1 can function as a bright material in the paint 10. Any component other than the flake 1 which is included in the paint 10 may be the same as in a conventional one. For example, the paint 10 may be obtained by including the flake 1 instead of a bright material in a known paint such as acrylic paints, urethane paints, epoxy paints and polyester paints.

1.3. Effect

Figure 4A:
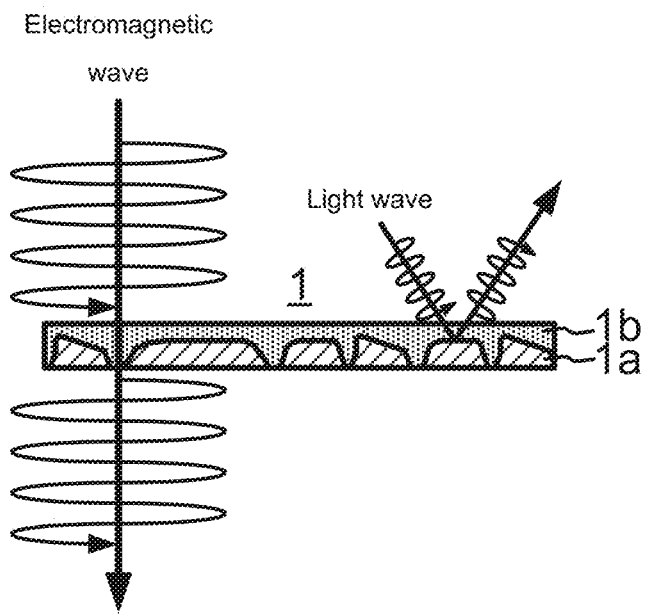
FIGS. 4A and 4B are explanatory schematic views showing effect of the flake 1.
Figure 4B:
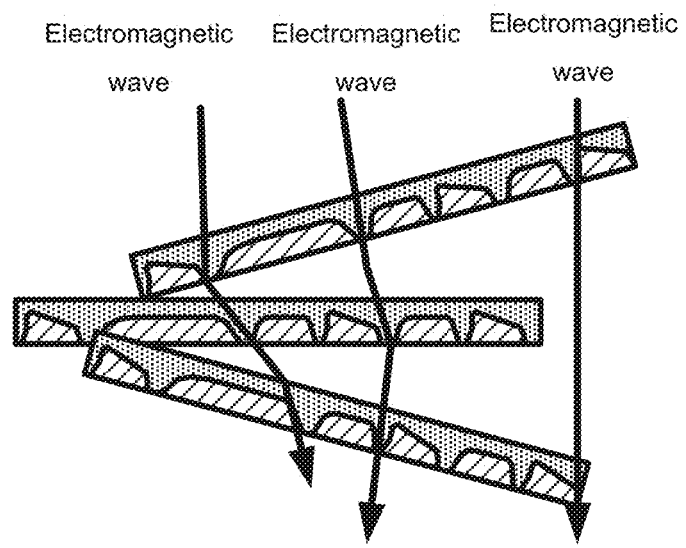

As shown in FIG. 4A, an electromagnetic wave of a long wavelength (for example, the wavelength at 77 GHz is 4 mm) can regard the island phase 1a in the flake 1 as a point. Thus, an electromagnetic wave can easily transmit a space between the island phases 1a. An electromagnetic wave can leak from spaces of the flakes 1 as well when a plurality of the flakes 1, 1, . . . are laminated as shown in FIG. 4B. In contrast, a light wave of a short wavelength regards the island phase 1a in the flake 1 as a face. Thus, a light wave is reflected by the surface of the island phase 1a. As described above, including the flake 1 having both brightness and radiotransparency in the paint 10 makes it possible to easily form a coating film having both brightness and radiotransparency. Since the flake 1 itself has radiotransparency, the number of laminated flakes 1 in a coating film etc. are unnecessarily controlled.

2. Method for Producing Paint

Figure 5:
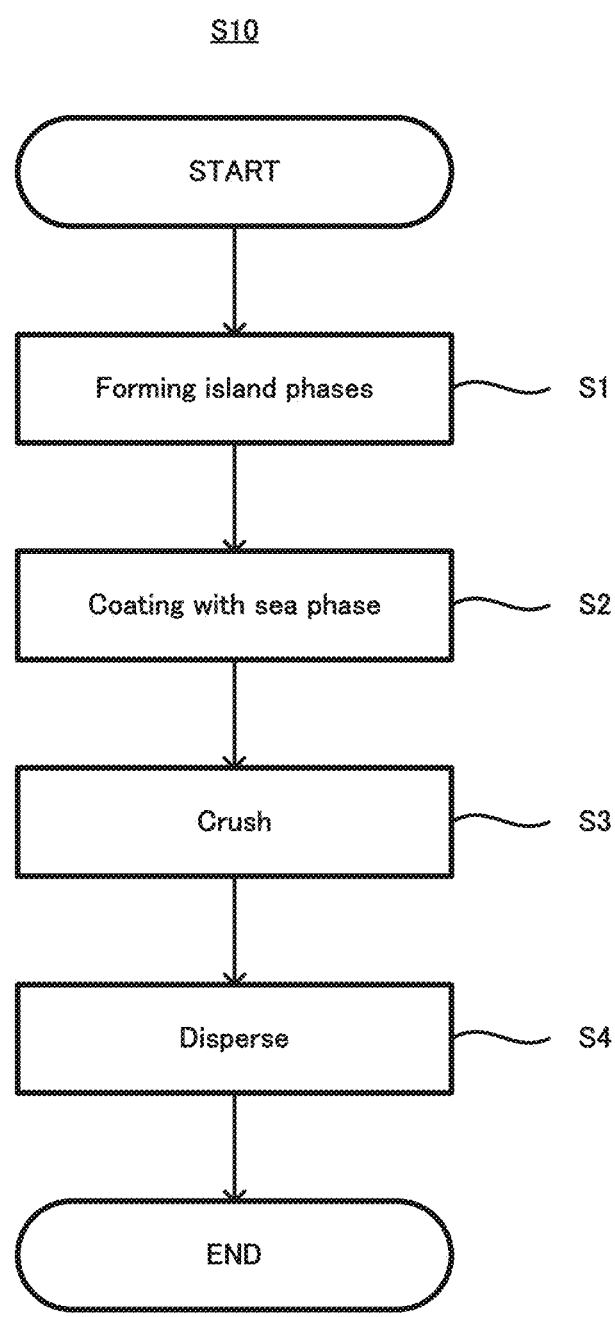
FIG. 5 is an explanatory flowchart of a method for producing the paint 10.
Figure 6:
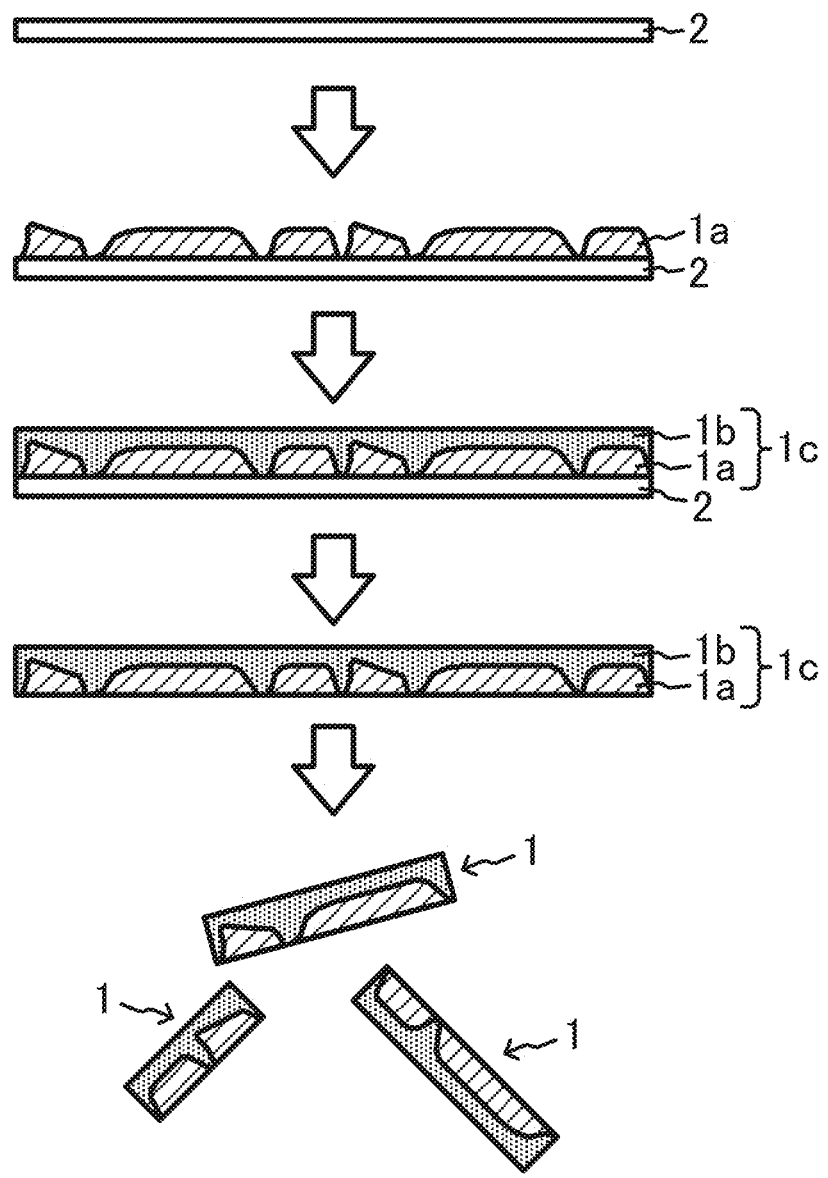
FIG. 6 is an explanatory schematic view showing one example of the method for producing the paint 10.
Figure 7:
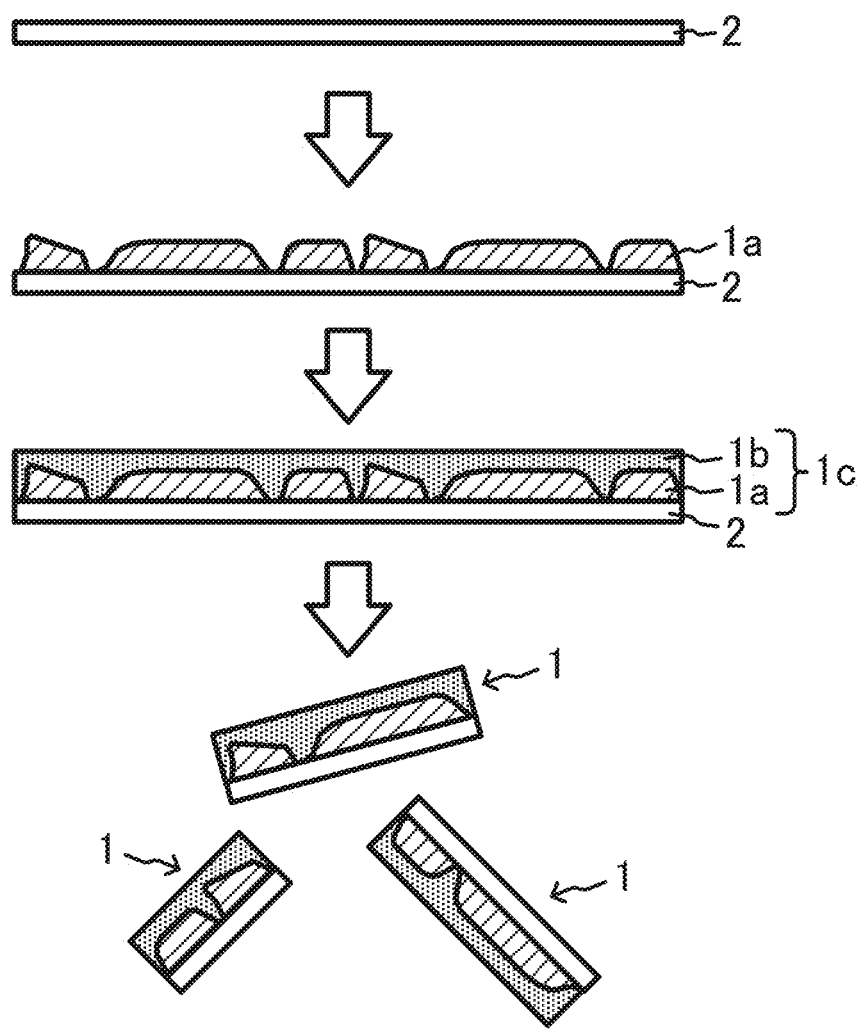
FIG. 7 is an explanatory schematic view showing another example of the method for producing the paint 10.
Figure 8:
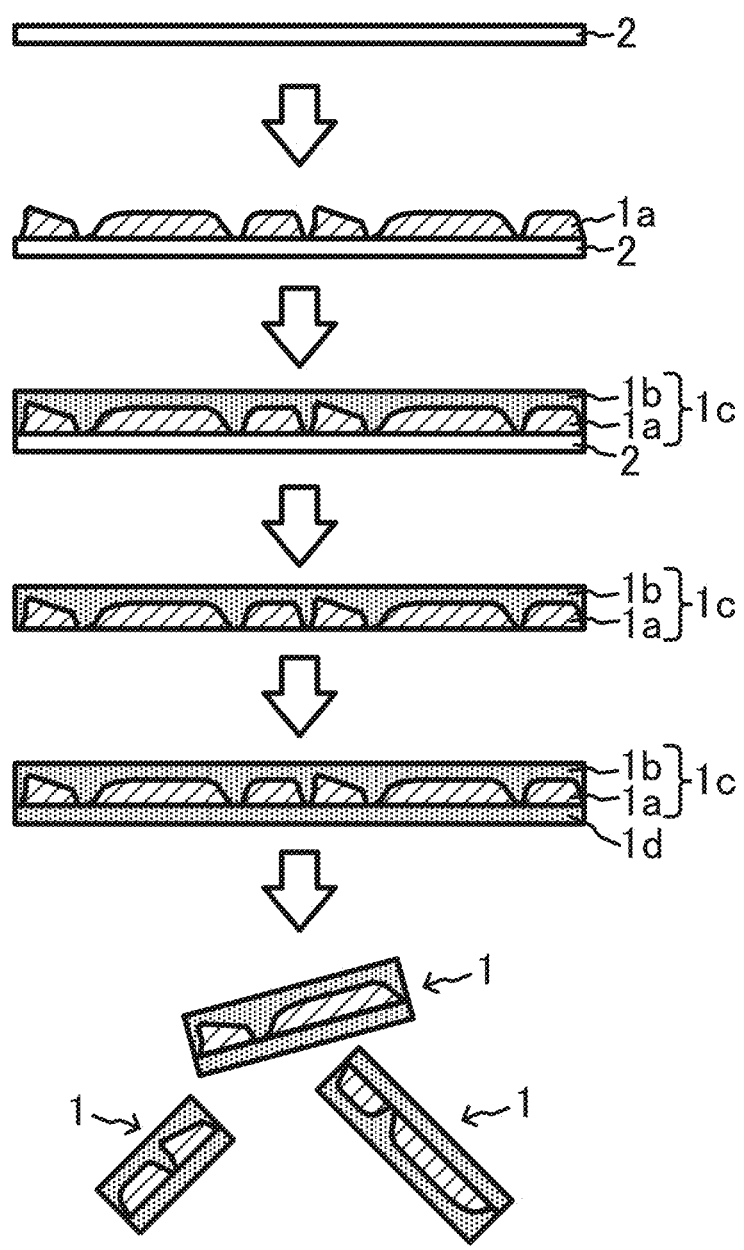
FIG. 8 is an explanatory schematic view showing yet another example of the method for producing the paint 10.

For example, the paint 10 can be easily produced by the following method. FIG. 5 shows the flow of a method for producing the paint 10 S10. FIGS. 6 to 8 each show an example of the method for producing the paint 10 S10. The producing method S10 comprises: a first step S1 of forming a plurality of the island phases 1a, 1a, . . . on a surface of a base material 2, the island phases being formed of metal; a second step S2 of coating the surface of the base material 2, on which the island phases 1a, 1a, . . . are formed, with resin or DLC, to form a film 1c on the surface of the base material 2, the film 1c having a sea-island structure of including the island phases 1a, 1a, . . . , and the sea phase 1b formed of the resin or DLC, the sea phase 1b linking the island phases 1a, 1a, . . . to each other; a third step S3 of crushing the film 1c to form the flakes 1, 1, . . . ; and a fourth step S4 of obtaining the paint 10 where the flakes 1, 1, . . . are dispersed.

2.1. First Step

In the first step S1, a plurality of the island phases 1a, 1a, . . . which are formed of metal are formed on the surface of the base material 2. The base material 2 is not specifically restricted, and may be suitably selected from an inorganic material such as glass, and an organic material such as resin. The shape of the base material 2 is not specifically restricted, and is preferably a flat plate or a film in view of making the flake 1 as flat as possible.

Figure 9:
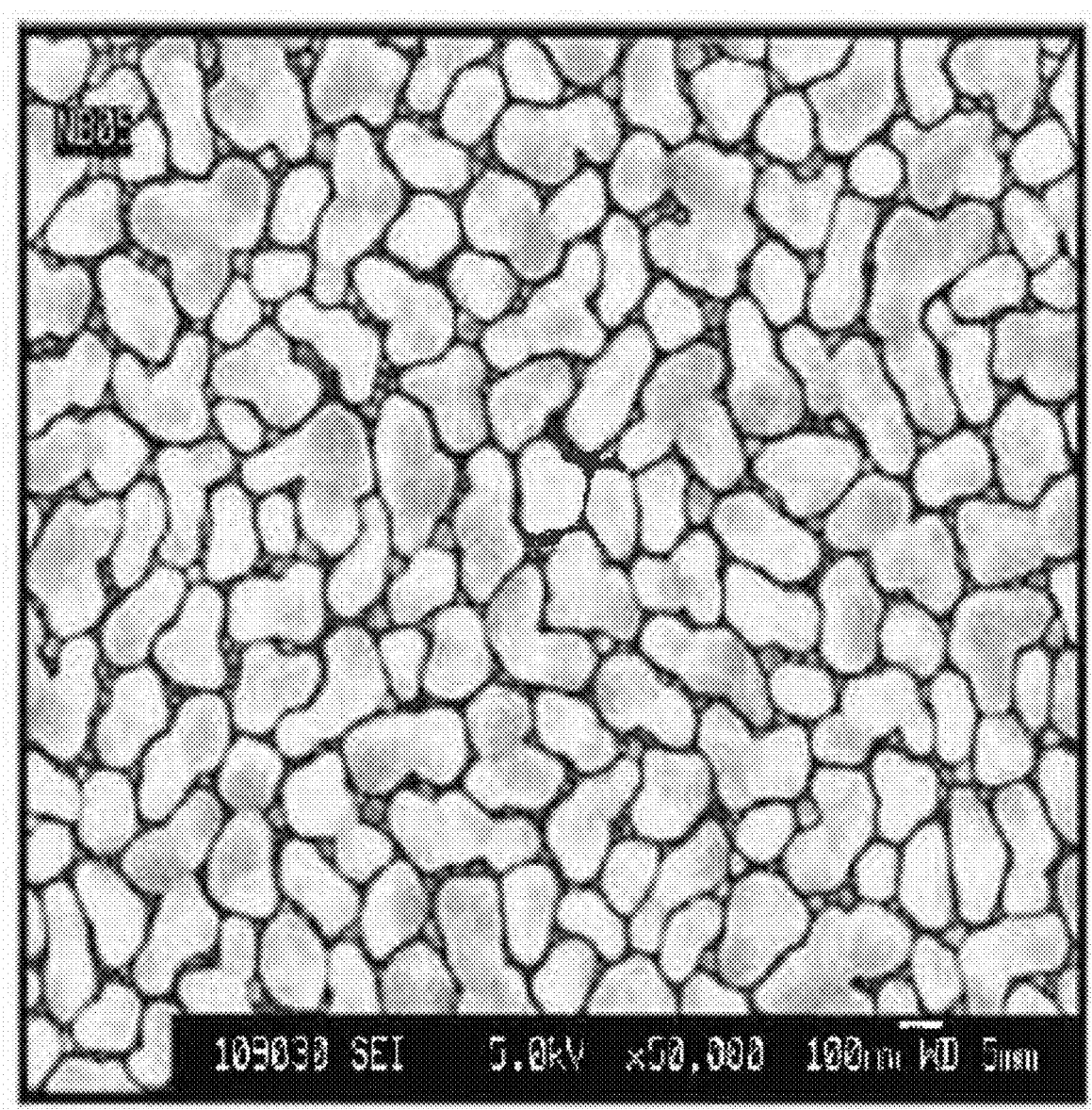
FIG. 9 is a photograph showing one example of a metallic island structure provided for a surface of a base material 2.

Examples of a method for forming a plurality of the island phases 1a, 1a, . . . which are formed of metal on the surface of the base material 2 include various methods such as, as shown in FIG. 9, chemical vapor deposition such as vapor deposition, and physical vapor deposition such as spattering, which make it possible to insularly adhere metal to the surface of the base material 2 (see J. Vac. Soc. Jpn., Vol. 53, No. 1, 2010). In this case, adjusting the time for vapor deposition etc. makes it possible to easily control the size of the metallic phases 1a, 1a, . . . . Alternatively, a plurality of the island phases 1a, 1a, . . . which are formed of metal can be also formed on the surface of the base material 2 with a method of spraying fine metal pieces over the surface of the base material 2, a method of laminating metal foil onto the surface of the base material 2, and then partially removing the metal foil to make islands, a method of printing a metal pattern on the surface of the base material 2, etc. A method of depositing metal on the surface of the base material 2 to form a plurality of the island phases 1a, 1a, . . . on the surface of the base material 2 is preferable among various methods in view of control of the size, homogeneity, etc. of each island phase 1a.

2.2 Second Step

In the second step S2, the surface of the base material 2, on which a plurality of the island phases 1a, 1a, . . . are formed, is coated with resin or DLC, to form, on the surface of the base material 2, a film 1c having a sea-island structure of including a plurality of the island phases 1a, 1a, . . . and the sea phase 1b that links the island phases 1a, 1a, . . . to each other and is formed of the resin or DLC. Since being not substantially in contact with each other, the island phases 1a, 1a, . . . would scatter by the island when the island phases 1a, 1a, . . . are released from the base material 2. In the second step S2, the island phases are linked to each other by the sea phase 1b so that flakes can be made as their island structure is kept.

A specific coating method with resin or DLC is not specifically restricted. Examples thereof include a method of applying resin onto the surface of the base material 2 on which the island phases 1a are formed and curing the resin, and a method of forming a film of DLC on the surface with plasma CVD or PVD. The thickness of the sea phase 1b is not specifically restricted, and may be suitably adjusted according to the characteristics to be aimed. As described above, the sea phase 1b may be provided so that the whole of the island phases 1a, 1a, . . . is completely buried therein, or so that part of the island phases 1a, 1a, . . . is exposed. The sea phase 1b may smooth the surface of the flake 1, or may be provided so as to have unevenness along the shapes of the surfaces of the island phases 1a, 1a, . . . . Via the second step S2, the film 1c of linking a plurality of the island phases 1a, 1a, . . . via the sea phase 1b is obtained.

2.3. Third Step

In the third step S3, the film 1c is crushed to form the flakes 1, 1, . . . . The concept "the film 1c is crushed" encompasses not only an embodiment of pealing the film 1c from the base material 2 and then crushing the film 1c as shown in FIG. 6, but also an embodiment of crushing the film 1c formed on the base material 2 together with the base material 2 as shown in FIG. 7, an embodiment of pealing the film 1c from the base material 2, further providing a protection layer 1d for the film 1c, and then crushing the film 1c together with the protection layer 1d as shown in FIG. 8, etc.

In the case where the film 1c is pealed from the base material 2 (FIGS. 6 and 8), releasability of the film 1c can be adjusted by selecting the base material 2. For example, providing the film 1c for the surface of the base material 2 that is formed of an inorganic material such as glass makes it possible to easily peal the film 1c from the base material 2.

In contrast, in the case where the film 1c is not pealed from the base material 2 (FIG. 7), that is, when the base material 2 remains on the flake 1, it is preferable to constitute the base material 2 of a material that can be stably present in a paint and has radiotransparency. For example, the base material 2 is preferably a resin film. A material of the resin film is not specifically restricted, and for example, may be the same as resin constituting the sea phase 1b.

In the case where the protection layer 1d is provided for the surface of the film 1c (FIG. 8), it is preferable to constitute the protection layer 1d of a material that can be stably present in a paint and has radiotransparency. For example, the protection layer 1d may be formed of resin or DLC as well as the sea phase 1b. A method of forming the protecting layer 1d on the surface of the film 1c is not specifically restricted, and may be, for example, the same as the method of forming the sea phase 1b.

In the third step S3, a method of crushing the film 1c is not specifically restricted. Any known crushing mill may be used as long as the film 1c forms flakes. In the third step S3, it is preferable to crush the film 1c so that the film 1c has a size of approximately dozens to several hundreds of micrometers which is enough to be mixed in a paint.

It can be considered that after a plurality of the island phases 1a, 1a, . . . are formed on the surface of the base material 2, a laminate of the base material 2 and the island phases 1a, 1a, . . . is crushed to form flakes without provision of the sea phase 1b. In this case however, the island phase 1a is easily released and/or slipped off from the surface of the base material 2, which may make it impossible to obtain the flakes to be aimed. Alternatively, after the flakes are formed, the island phase 1a is easily released and/or slipped off from the flakes. In this point, as described above, it is important to link a plurality of the island phases 1a, 1a, . . . by the sea phase 1b to form the film 1c.

2.4. Fourth Step

In the fourth step S4, the paint 10 where the flakes 1, 1, . . . are dispersed (see FIG. 1) is obtained. As described above, the paint 10 may be obtained by including the flake 1 instead of a bright material in a known paint such as acrylic paints, urethane paints, epoxy paints and polyester paints.

3. Painted Component

Figure 10:
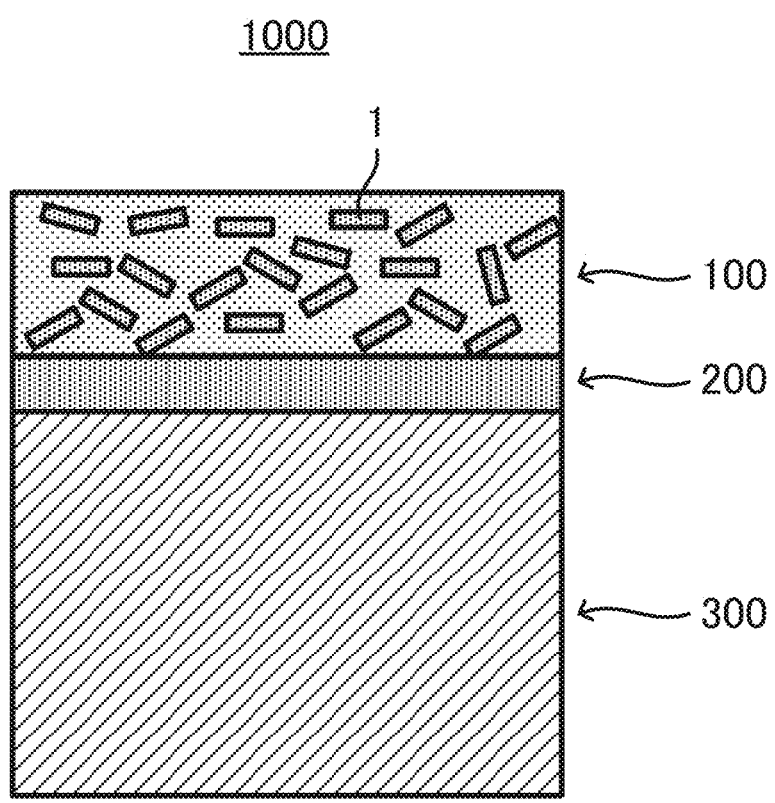
FIG. 10 is an explanatory schematic view of a coated component 1000.

FIG. 10 schematically shows an example of the structure of a coated component 1000. As shown in FIG. 10, the coated component 1000 has a coating film 100 on its surface. Here, the coating film 100 includes a plurality of the flakes 1, 1, . . . , and each of the flakes 1 has a sea-island structure of including a plurality of the island phases 1a, 1a, . . . which are formed of metal, and the sea phase 1b that is formed of resin or DLS, the sea phase 1b linking the island phases 1a, 1a, . . . to each other.

3.1. Coating Film

The coating film 100 is, for example, provided for a surface of a component 300, or a surface of a primary coat 200, The thickness of the coating film 100 is not specifically limited, and may be suitably adjusted according to the aim. In the coating film 100, a plurality of the flakes 1, 1, . . . disperse randomly. As described above, since the flake 1 itself has brightness and radiotransparency, a radio wave can transmit the coating film 100 even if the flakes 1, 1, . . . are laminated to each other in the coating film 100 (see FIG. 4B). That is, the coating film 100 can keep desired radiotransparency as well if the flakes 1, 1, . . . are densely laid over in the coating film 100 to further improve brightness. The insulation property of the flake 1 is secured by the sea phase 1b, which makes it possible to suppress the conduction of the flakes 1, 1, . . . to each other as low as possible even if the flakes 1, 1, . . . are densely laminated onto each other to be arranged. This makes it possible to suppress the risk of deteriorating the performance of radiotransparency due to the conduction of the flakes 1, 1, . . . to each other as small as possible. Since the flakes 1, 1, . . . themselves have radiotransparency, the orientations of the flakes 1, 1, . . . , the number of laminated flakes 1, 1, . . . , etc. are not necessarily controlled in the coating film 100, a coating property of the paint can be kept as described later, and in addition, the influence of repeated painting for repair etc. can be suppressed as small as possible.

3.2. Others

The primary coat 200 may be provided for the coated component 1000 for improving the adhesiveness and smoothness of the coating film 100. A middle layer other than the primary coat 200 may be provided between the coating film 100 and the component 300. The structures of the primary coat 200 and the other middle layer are well known, and detailed descriptions thereof are omitted here.

3.3. Specific Examples

The coated component 1000 has only to be a component from which both brightness and radiotransparency are demanded. Examples thereof include a cover component of a radio source. More specifically, a radar dome member of an onboard radar and an exterior member covering an onboard radar are preferable. An exterior member covering an onboard radar may be not only a grill cover but also a member having a large coated area. As described later, since coating can be performed by spray of the paint 10, the coated component 1000 may be employed for a bumper and a body which have a large coated area.

4. Method for Producing Coated Component

As described above, in the paint 10 of this disclosure, the flake 1 itself has brightness and radiotransparency, and the direction of the flake 1 in the coating film is not necessarily controlled. Therefore, the coated component can be produced via the same coating steps as the conventional. For example, the coated component 1000 may be produced via a step of spraying the paint 10 of the present disclosure over the surface of the component 300 to coat the surface with the paint 10. In the method for producing the coated component of the present disclosure, no special structure or material is necessary in coating, and just the step of producing the flake 1 is changed and the other steps of producing, and coating of the paint may be the same as the conventional, which makes it possible to inexpensively produce the coated component. Since paintability with spray can be secured as described above, the method may be employed for a component having a large coated area, and for example, all the surface of a bumper may be easily coated even if a radar is arranged inside the bumper.

INDUSTRIAL APPLICABILITY

The paint of the present disclosure can be widely used when a component from which both brightness and radiotransparency are demanded is coated. For example, a radar of a high frequency wave has been employed as an onboard radar in recent years. The wavelength thereof is shorter than that of a conventional radar, and attenuation of a radio wave due to a bright material included in a coating material is being a problem. The technique of the present disclosure is a technique that makes it possible for a coating film to secure brightness and radiotransparency without spoiling paintability for an automobile component, and can be widely employed for an exterior member of an onboard radar etc. that will be widely employed further.

REFERENCE SIGNS LIST

1 flake
1*a* island phase
1*b* sea phase
10 paint
100 coating film
1000 coated component

What is claimed is:

1. A paint including a flake,
   wherein the flake has a sea-island structure of including a plurality of island phases which are formed of metal, and a sea phase that is formed of DLC, the sea phase linking the island phases to each other.

2. The paint according to claim 1, wherein the island phases are arranged in a width direction of the flake.

3. The paint according to claim 1, wherein the number of the island phases arranged in a thickness direction of the flake is only one.

4. A method for producing the paint according to claim 1, the method comprising:
   a first step of forming a plurality of island phases on a surface of a base material, the island phases being formed of metal;
   a second step of coating the surface of the base material, on which the island phases are formed, with DLC, to form a film on the surface of the base material, the film having a sea-island structure of including the island phases, and a sea phase formed of the DLC, the sea phase linking the island phases to each other;
   a third step of crushing the film to form flakes; and
   a fourth step of obtaining a paint where the flakes are dispersed.

5. The method according to claim 4,
   wherein in the first step, the metal is deposited on the surface of the base material, to form the island phases on the surface of the base material.

6. A coated component that has a coating film on a surface thereof,
   wherein the coating film includes a plurality of flakes, and each of the flakes has a sea-island structure of including a plurality of island phases which are formed of metal, and a sea phase that is formed of DLC, the sea phase linking the island phases to each other.

7. A method for producing a coated component, the method comprising:
   spraying the paint according to claim 1 over a surface of a component to coat the component.

\* \* \* \* \*